Oct. 26, 1965  J. O. FABER  3,214,257
MOLD CHARGE DELIVERING MEANS
Filed Dec. 5, 1961
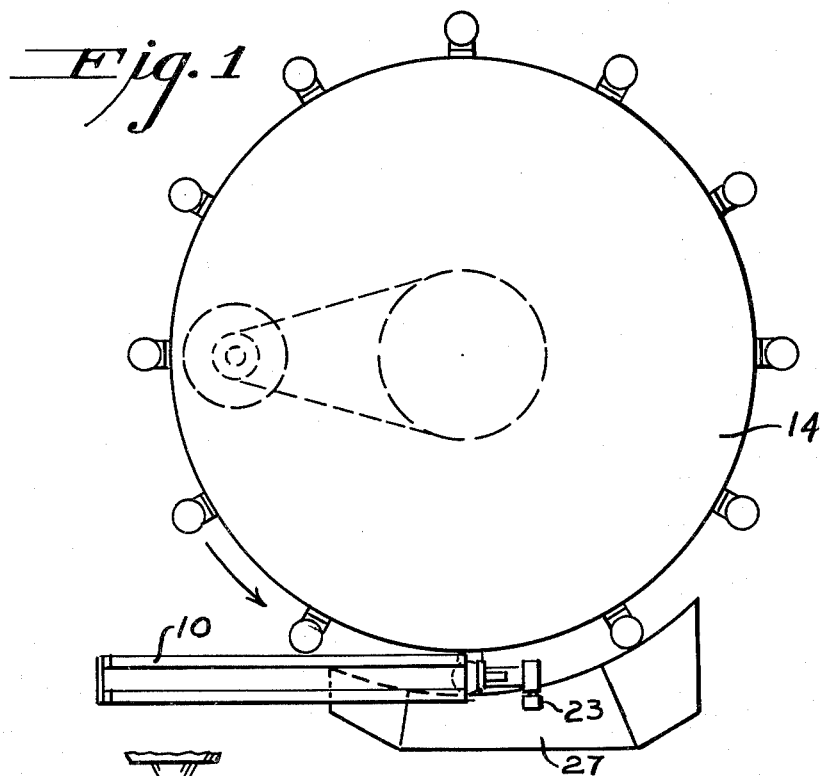
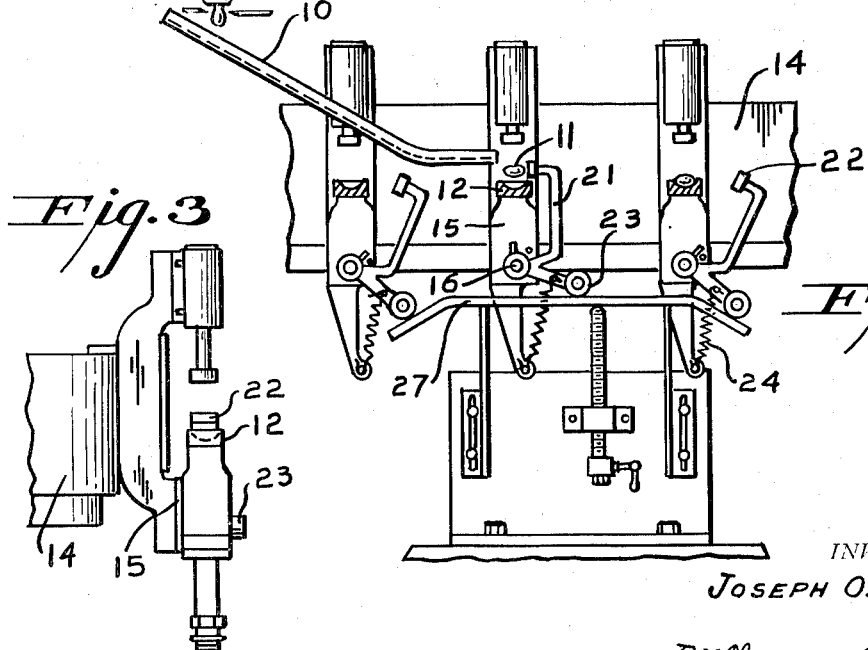
INVENTOR.
JOSEPH O. FABER
BY Clarence R. Batty, Jr.
ATTORNEY

United States Patent Office 3,214,257
Patented Oct. 26, 1965

3,214,257
MOLD CHARGE DELIVERING MEANS
Joseph O. Faber, Elmira, N.Y., assignor to Corning Glass Works, Corning, N.Y., a corporation of New York
Filed Dec. 5, 1961, Ser. No. 157,191
5 Claims. (Cl. 65—225)

The present invention relates to the delivery of charges of molten glass and more particularly to a novel means and method for loading such charges into a series of continuously moving containers or molds of a glass article forming machine.

Molded glass articles are commonly produced by a continuous operation wherein a series of molds move through various positions, regions or zones of their path of travel in which, successively, they are loaded with charges of molten glass, the charges are formed into articles therein, and the articles are then removed from the molds. The molds may be caused to stop during the respective operations, or the operations may be performed during their continued movement. The present invention is concerned with operations carried on in the latter fashion.

Since the rate at which articles are formed is limited to the rate at which charges of molten glass can be loaded into the molds, it becomes desirable to move as many molds as possible through the loading zone per unit of time during the operation of the machine. For a maximum rate of production it is accordingly necessary to move the molds at a linear speed which makes it difficult to deliver a charge at a precise place in such zone at the precise time of arrival of the mold at such place.

It is, accordingly, an object of the present invention to provide a method of and apparatus for loading charges into a series of continuously moving molds which minimizes the effects of imprecise timing in the delivery of charges to the loading zone and which assures uniformly accurate deposition of such charges in the moving molds.

According to the invention the forming machine at the loading zone is provided with a chute, which conveys the glass charges from their source along a path generally coextensive with and in the same direction as the path of travel of the molds as they pass through such zone and at a level slightly above the molds. Each mold is provided with a charge deflector that normally is positioned to one side of the mold so as not to interfere with equipment employed in the formation of a charge previously deposited therein or with equipment employed in the removal of an article therefrom. Along the loading zone, means is provided for positioning the deflector over the leading edge of the mold at an exact desired position over the mold that it is desired to intercept a charge issuing from the chute, such means permitting the deflector to restore to its normal position a short distance beyond the loading zone.

The construction and operation of one embodiment of the present invention can best be understood by reference to the accompanying drawing, wherein:

FIG. 1 is a top plan view representing a structure embodying the invention.

FIG. 2 is a front elevation of a fragment of the structure of FIG. 1.

FIG. 3 is a side elevational view of a fragment of the rotary support of FIG. 1 and of one of a plurality of forming units arranged thereabout.

Referring to the drawing in detail, a charge of molten glass severed from a source according to means well known in the art is deposited at the top of a downwardly slanting chute 10 and whose lower or delivery end is oriented to issue charges at a loading zone in the region just beyond the lower end of the chute. The lower end of the chute is so positioned that when a charge 11 leaves the chute, it is traveling approximately horizontally above a mold 12, conveniently supported by a continuously rotating turret 14, and in a line coextensive with the mold path through the loading zone. A bell crank such as 21, conveniently pivotally supported as at 16 on a mold support such as 15, at its upper end carries a deflector such as 22 and at its lower end a cam follower roller such as 23. A spring such as 24 normally holds the bell crank 21 in a position that maintains the deflector to one side of the mold. A cam track 27 is arranged alongside the turret 14 in the region below the loading zone and extending in opposite directions therefrom.

As a mold approaches the loading zone, the roller such as 23 rides onto track 27 to turn the bell crank to its alternative position and thus orient its deflector over the forward edge of the mold in readiness to intercept a charge of molten glass timed to issue from chute 10 as the mold enters the loading zone. The slope of chute 10 is such that the horizontal component of the velocity of a charge as it emerges therefrom is greater than the velocity of the mold, thus the charge is impelled against the deflector and falls into the mold 12. Since the velocity of the charge as it issues from the chute exceeds that of the mold and the deflector retards its velocity to that of the mold, the exact position of the mold in advance of the open end of the chute at the time of issuance of a charge therefrom is not critical.

What is claimed is:

1. In a glass charging system a plurality of open topped containers attached to a continuously moving support which successively passes said containers over a path extending through a loading zone, a container charge chute having an open delivery end arranged above the entrance to such zone and facing in the general direction of travel of such containers, a charge deflector associated with each said container and movable between a position above the leading edge of its respective container and an alternative position with respect thereto, means normally holding each said deflector in its latter position, and means for moving each said deflector to its first defined position in response to the movement of its associated container from under the delivery end of the chute and for holding the respective deflector in such position during a predetermined distance of the subsequent movement of the associated container.

2. The combination with a continuously moving horizontal support having a plurality of open topped molds thereon successively passing under the delivery end of a mold charging chute having a delivery end opening faced in the general direction of travel of said molds, of a mold charge deflector associated with each mold each such deflector pivoted for movement over the most forward region of its respective mold, a first means for normally holding each such deflector in an initial position with respect to its associated mold; and a second means for moving each deflector to an alternative position with respect to its associated mold and in response to the movement of such mold as it is about to pass from under the delivery end of said chute and, in response to further movement of such mold, for subsequently freeing the associated deflector for restoration thereof by said first means to its said initial position with respect to its mold.

3. A combination as in claim 2 wherein the support comprises a turret rotatable about a vertical axis and wherein the molds are arranged thereon in uniformly spaced relation in a circular row concentric to the support axis.

4. A combination as in claim 2 which includes a bell crank for each deflector each such crank pivoted intermediate its ends and having one arm of which supports the associated deflector and another arm whose free end is provided with a roller, the means associated with each deflector for normally holding it in its initial position comprising a spring, and the means for moving each deflector to an alternative position comprising a cam track for engagement by the roller of the respectively associated crank, said track being located in a region in part overlapped by the delivery end of said chute and extending forward thereof along a path coextensive with the path of travel of said molds.

5. In combination with a continuously moving horizontal support comprising a turret rotatable about a vertical axis and having a plurality of open topped molds arranged thereon in uniformly spaced relation in a circular row concentric to the support axis and successively passing under the delivery end of a mold charging chute having a delivery end opening faced in the general direction of travel of said molds; a mold charge deflector associated with each mold, each such deflector including a bell crank having one arm which supports the associated deflector and another arm whose free end is provided with a roller, each such crank pivoted intermediate its ends for movement over the most forward region of its associated mold; a first means, comprising a spring associated with each deflector, for normally holding the associated deflector in an initial position with respect to its respectively associated mold; and a second means for moving each deflector to an alternative position with respect to its associated mold and in response to the movement of such mold as it is about to pass from under the delivery end of said chute and, in response to further movement of such mold, for subsequently freeing the associated deflector for restoration thereof by said first means to its said initial position with respect to its mold, such second means comprising a cam track arranged for engagement by the roller of each said crank, said track being located in a region in part overlapped by the delivery end of said chute and extending forward thereof along a path coextensive with the path of travel of said molds.

References Cited by the Examiner
UNITED STATES PATENTS

| | | | |
|---|---|---|---|
| 1,551,513 | 8/25 | Headley et al. | 65—123 |
| 1,662,848 | 3/28 | Cramer | 65—225 |
| 2,199,356 | 4/40 | Brown | 65—58 XR |
| 2,388,876 | 11/45 | Smith | 65—225 |

DONALL H. SYLVESTER, *Primary Examiner.*

MORRIS O. WOLK, WILLIAM B. KNIGHT,
*Examiners.*